United States Patent Office 2,995,076
Patented Aug. 8, 1961

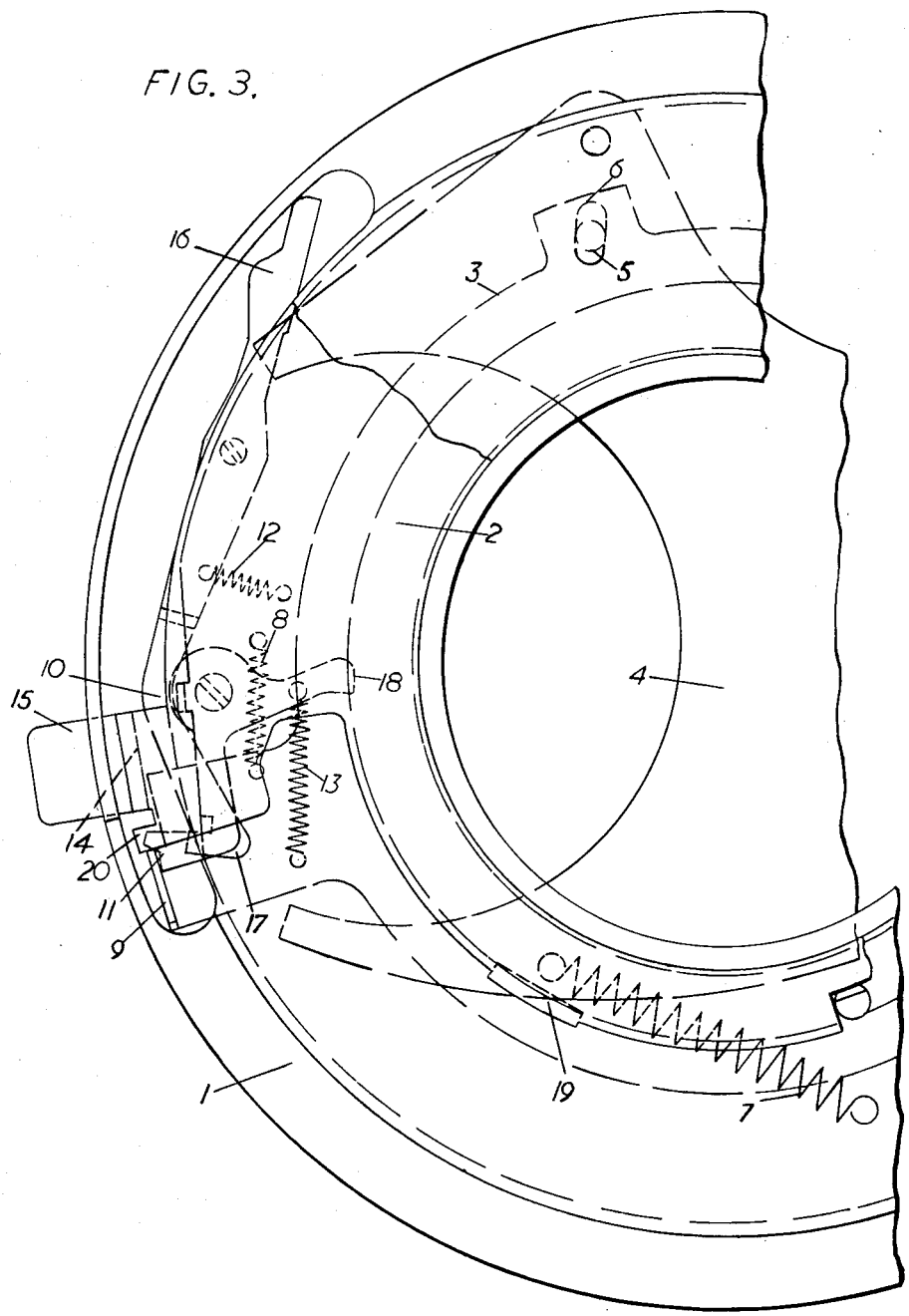

2,995,076
PHOTOGRAPHIC BETWEEN-THE-LENS SHUTTER DEVICE
Helmut Tillig and Werner Hahn, Dresden A, Germany, assignors to VEB Kamera- und Kinowerke Dresden, Dresden, Germany
Filed Dec. 28, 1959, Ser. No. 862,216
1 Claim. (Cl. 95—63)

The present invention relates to a photographic between-the-lens shutter device having an auxiliary shutter serving for security against light, which is opened before the commencement of the exposure operation and is closed after the termination thereof.

Shutters of this type which have become known hitherto were of such a nature that the auxiliary shutter was controlled in dependence upon the actuation of the release lever. In this manner a disadvantageous, relatively high, release pressure was produced, which had an unfavourable effect especially in the case of release controlled through a linkage.

The object of the invention is to avoid the above disadvantages, through a novel control of the auxiliary shutter.

In accordance with the invention this is achieved due to the fact that levers pivoted by the cocking and running-off movement of the shutter-cocking ring hold an auxiliary blade ring against a spring which rotates it, and releases it.

A constructional form of the invention is illustrated by way of example in the accompanying diagrammatic drawing wherein:

FIGURE 3 shows the shutter in the rest position.

Figure 1:
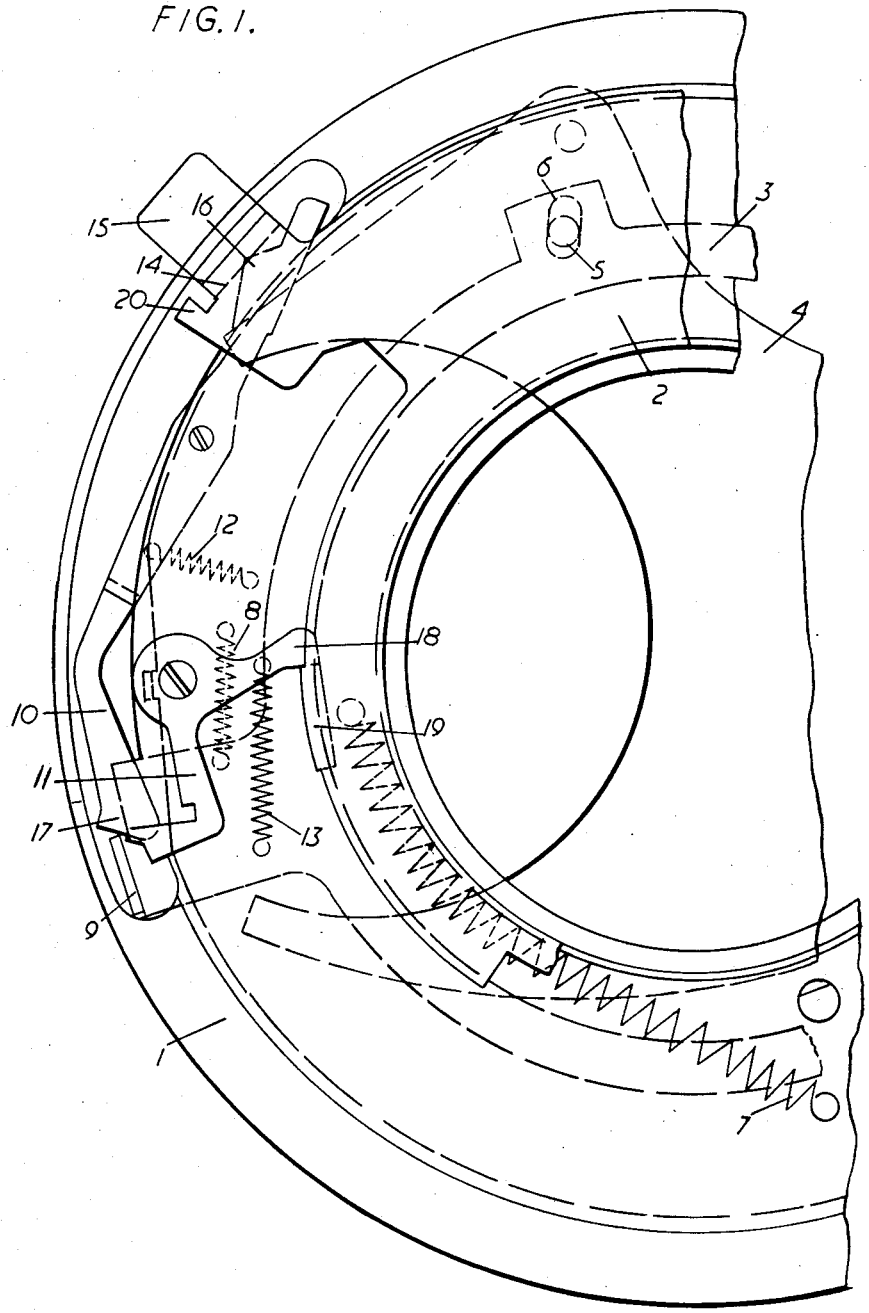
FIGURE 1 is an axial view of a shutter made in accordance with the invention.

In a shutter housing 1 there are rotatably mounted a cocking ring 2 and an auxiliary blade ring 3. The auxiliary blade ring 3 carries pins 5, which engage in slots 6 of auxiliary blades 4. On the cocking ring 2 there is secured a spring 7, and on the auxiliary blade 3 there is secured a spring 8. Furthermore the auxiliary blade ring 3 has a lug 9 in the path of which there lie a release lever 10 and a blocking lever 11. Both levers are subject to the action of springs 12 and 13.

The manner of operation of the new control arrangement is as follows:

When the shutter mechanism is cocked (see FIGURE 1) the surface 14 of an angled cocking ring handle 15 presses upon a dog 16 of the release lever 10, so that the latter is rotated against the spring 12 in the clockwise direction and comes to lie with its end 17 in the path of the lug 9. The spring 8 of the auxiliary blades 4 remains in the closed position. The blocking lever 11 is meanwhile held by the lug 19 of the cocking ring 2 against the spring 13 out of the path of the lug 9 situated on the auxiliary blade ring 3.

Figure 2:
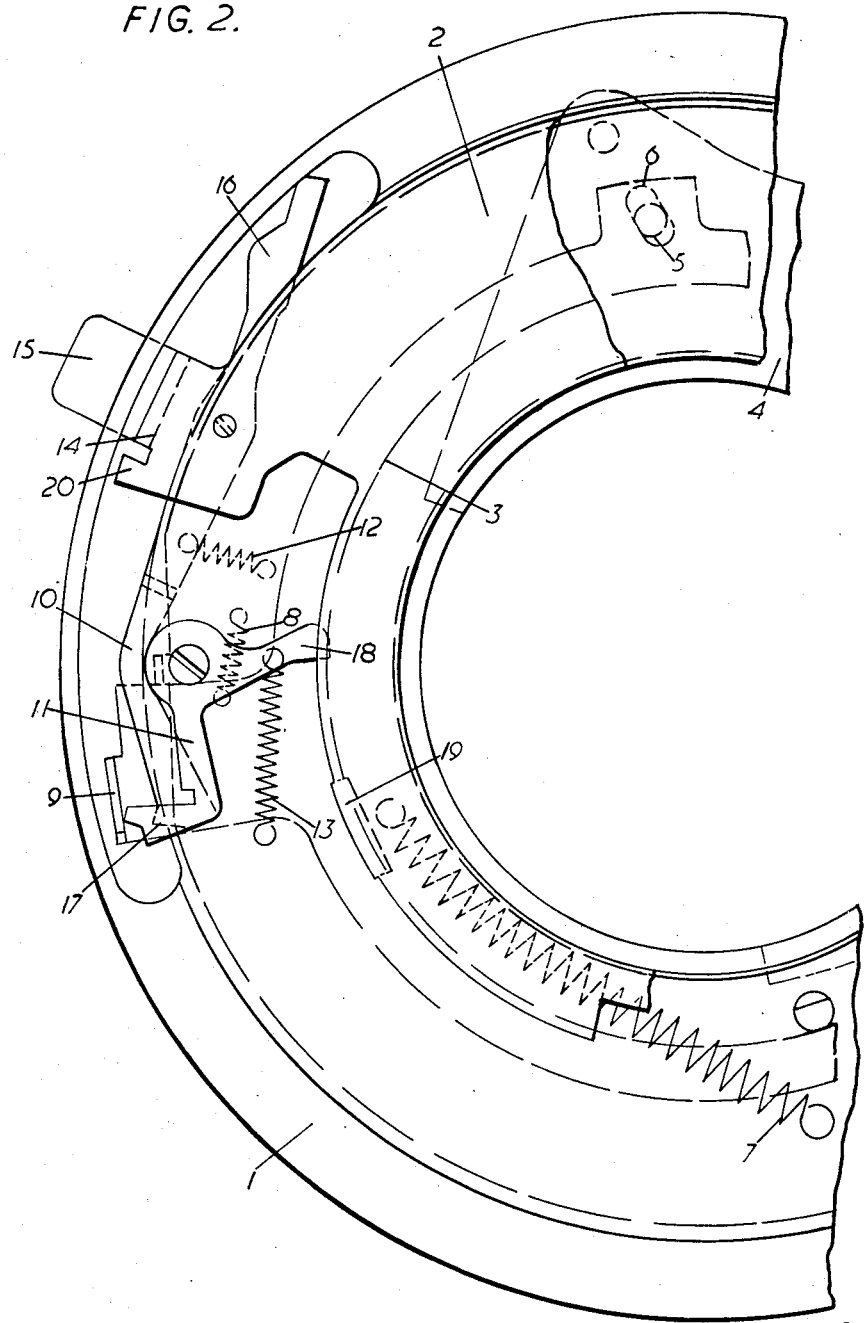
FIGURE 2 shows the same shutter during running-off.

When the cocking ring 2 runs off (see FIGURE 2) under the action of the spring 7, the surface 14 of the cocking ring handle 15 leaves the dog 16 of the release lever 10, so that the spring 12 pivots its end 17 out of the path of the lug 9. Consequently the spring 8 can rotate the auxiliary blade ring 3 in the clockwise direction and move the auxiliary blades 4 into the open position. Furthermore the lug 19 of the cocking ring 2 has departed from the arm 18 of the blocking lever 11 and therefore released it. The blocking lever 11 presses under the action of the spring 13 against the lug 9 of the auxiliary blade ring 3.

Towards the end of the running-off movement the cocking ring 2 (see FIGURE 3) strikes with the nose 20 of the handle 15 upon the lug 9 and thus rotates the auxiliary blade ring 3 in the counter-clockwise direction, the spring 8 being tensioned. As soon as the end position is reached, that is to say the auxiliary blades 4 have covered the light aperture, the blocking lever 11 drops before the lug 9 and secures the blocking position of the auxiliary blade ring 3. This blocking position is only left again on instigation of the next picture-taking operation.

We claim:

In a photographic between-the-lens camera shutter having a housing, a cocking ring rotatably mounted within the housing and movable from a rest position to a cocked position, a first spring for driving the cocking ring connected between the cocking ring and the housing, releasable means for holding the cocking ring in its cocked position, a plurality of aperture covering blades pivotally mounted within the housing, a blade driving ring rotatably mounted within the housing having a plurality of driving pins arranged on the driving ring for engagement with slots provided in the covering blades, a second spring for driving the blade driving ring connected between the housing and said blade driving ring for urging said blades towards the open position thereof, the provision of a first projection extending from the cocking ring, a second projection extending from the blade driving ring, a first lever pivotally mounted within the housing having first and second arms, the first arm being movable into and out of the path of said first projection, and the second arm being movable into and out of the path of said second projection, a third spring connected between the housing and said first lever for urging the first arm towards the path of the first projection and the second arm away from the path of the second projection, a third projection extending from the cocking ring, a second lever pivotally mounted within the housing having third and fourth arms, the third arm being engageable by said third projection, and the fourth arm being movable into and out of the path of said second projection, a fourth spring connected between the housing and said second lever for urging the fourth arm towards the path of the second projection, whereby towards the end of the cocking operation the first projection moves the first arm out of the path of said first projection thereby bringing the second arm into the path of said second projection, and the third arm is engaged by said third projection thereby moving the fourth arm out of the path of the second projection, on commencement of the running down movement of the cocking ring under the influence of the first spring after release the first projection releases the first arm thereby allowing the second arm to move out of the path of the second projection under the influence of said third spring in order to release the blade driving ring which opens the covering blades, the third projection releases the second lever, and towards the end of the running down movement of the cocking ring the first projection engages the second projection to move the driving ring against the action of the second spring to close the covering blades, said fourth arm moving into the path of said second projection under the action of the fourth spring as the third projection has moved away from the third arm.

References Cited in the file of this patent
UNITED STATES PATENTS

| | | |
|---|---|---|
| 2,002,109 | Coursen | May 21, 1935 |
| 2,232,969 | Ranft | Feb. 25, 1941 |
| 2,511,201 | Fuerst | June 13, 1950 |
| 2,524,786 | Fuerst | Oct. 10, 1950 |
| 2,772,614 | Rentschler | Dec. 4, 1956 |
| 2,838,983 | Burger | June 17, 1958 |